United States Patent
Alves et al.

(10) Patent No.: US 9,847,666 B2
(45) Date of Patent: Dec. 19, 2017

(54) POWER MANAGEMENT FOR INDUCTIVE CHARGING SYSTEMS

(71) Applicant: Apple Inc., Cupertino, CA (US)

(72) Inventors: Jeffrey M. Alves, Cupertino, CA (US); Todd K. Moyer, Cupertino, CA (US); Chad Bossetti, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 14/468,995

(22) Filed: Aug. 26, 2014

(65) Prior Publication Data

US 2015/0061588 A1 Mar. 5, 2015

Related U.S. Application Data

(60) Provisional application No. 61/873,256, filed on Sep. 3, 2013.

(51) Int. Cl.
*H02J 7/00* (2006.01)
*H02J 7/02* (2016.01)
*H02J 5/00* (2016.01)

(52) U.S. Cl.
CPC ............ *H02J 7/025* (2013.01); *H02J 5/005* (2013.01); *H02J 7/0021* (2013.01); *H02J 7/0032* (2013.01); *H02J 2007/004* (2013.01); *Y02T 10/7055* (2013.01)

(58) Field of Classification Search
CPC ...................................... H02J 7/025
USPC ........................................ 320/108
See application file for complete search history.

(56) References Cited

U.S. PATENT DOCUMENTS

| 5,157,319 A | 10/1992 | Klontz et al. |
| 5,710,503 A * | 1/1998 | Sideris ............... G01R 31/3648 |
| | | 320/116 |
| 5,742,148 A | 4/1998 | Sudo et al. |
| 5,764,572 A | 6/1998 | Hammick |
| 6,567,522 B1 | 5/2003 | Blackburn |

(Continued)

FOREIGN PATENT DOCUMENTS

| CA | 2489701 | 6/2006 |
| CN | 101621220 | 1/2010 |

(Continued)

OTHER PUBLICATIONS

Invitation to Pay Additional Fees dated Jan. 28, 2015, PCT/US2014/053481, 5 pages.

(Continued)

*Primary Examiner* — Edward Tso
*Assistant Examiner* — Ahmed Omar
(74) *Attorney, Agent, or Firm* — Brownstein Hyatt Farber Schreck, LLP

(57) ABSTRACT

Power management and power transfer systems within the transmit and receive portions of an inductive charging system. An inductive charging system may include an inductive charging station to transmit power and a portable electronic device to receive power. Embodiments may take the form of power transfer systems within an inductive charging station including load-based transmit frequency adjustments. Embodiments may also take the form of power management systems within portable electronic devices which conserve power by disconnecting circuits from ground when those circuits are in an idle state.

18 Claims, 6 Drawing Sheets

(56) References Cited

U.S. PATENT DOCUMENTS

| | | |
|---|---|---|
| 6,825,620 B2 | 11/2004 | Kuennen |
| 6,844,702 B2 | 1/2005 | Giannopoulos et al. |
| 6,885,529 B2 | 4/2005 | Ker et al. |
| 7,522,878 B2 | 4/2009 | Baarman |
| 7,560,902 B2 | 7/2009 | Unger |
| 7,760,101 B2 | 7/2010 | Ales, III et al. |
| 7,948,208 B2 | 5/2011 | Partovi et al. |
| 7,952,322 B2 | 5/2011 | Partovi et al. |
| 8,004,235 B2 | 8/2011 | Baarman et al. |
| 8,115,420 B2 | 2/2012 | Morooka et al. |
| 8,129,864 B2 | 3/2012 | Baarman et al. |
| 8,169,185 B2 | 5/2012 | Partovi et al. |
| 8,330,414 B2 | 12/2012 | Takahashi et al. |
| 8,441,244 B2 | 5/2013 | Bianco et al. |
| 8,446,046 B2 | 5/2013 | Fells et al. |
| 8,531,153 B2 | 9/2013 | Baarman et al. |
| 8,629,652 B2 | 1/2014 | Partovi et al. |
| 8,629,654 B2 | 1/2014 | Partovi et al. |
| 8,890,470 B2 | 11/2014 | Partovi |
| 8,896,264 B2 | 11/2014 | Partovi |
| 8,901,881 B2 | 12/2014 | Partovi |
| 8,928,276 B2 | 1/2015 | Kesler |
| 8,933,594 B2 | 1/2015 | Kurs |
| 8,942,624 B2 | 1/2015 | Singh et al. |
| 8,947,047 B2 | 2/2015 | Partovi et al. |
| 9,000,620 B2 | 4/2015 | Kim et al. |
| 9,018,898 B2 | 4/2015 | Ziv et al. |
| 9,087,638 B2 | 7/2015 | Oettinger |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,178,369 B2 | 11/2015 | Partovi |
| 9,178,387 B2 | 11/2015 | Mohammadian et al. |
| 9,257,851 B2 | 2/2016 | Baarman et al. |
| 9,276,437 B2 | 3/2016 | Partovi et al. |
| 9,356,659 B2 | 5/2016 | Partovi |
| 9,362,779 B2 | 6/2016 | Takahashi |
| 9,407,109 B2 | 8/2016 | Takahashi et al. |
| 9,496,793 B2 | 11/2016 | Bruwer et al. |
| 9,583,970 B2 | 2/2017 | Hsia et al. |
| 2003/0214821 A1* | 11/2003 | Giannopoulos ......... H02J 7/025 363/21.02 |
| 2007/0228833 A1* | 10/2007 | Stevens ................ H02J 5/005 307/45 |
| 2011/0050164 A1 | 3/2011 | Partovi et al. |
| 2011/0221385 A1 | 9/2011 | Partovi et al. |
| 2012/0068548 A1 | 3/2012 | Endo et al. |
| 2013/0093388 A1 | 4/2013 | Partovi |
| 2013/0099563 A1 | 4/2013 | Partovi et al. |
| 2013/0162051 A1 | 6/2013 | Michihata et al. |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0103873 A1 | 4/2014 | Partovi et al. |
| 2014/0132210 A1 | 5/2014 | Partovi |
| 2014/0191568 A1 | 7/2014 | Partovi |
| 2014/0306654 A1 | 10/2014 | Partovi |
| 2015/0097443 A1 | 4/2015 | Moyer et al. |
| 2015/0130412 A1 | 5/2015 | Partovi |
| 2015/0137617 A1 | 5/2015 | Menzel et al. |
| 2015/0137750 A1 | 5/2015 | Kirby et al. |
| 2015/0194814 A1* | 7/2015 | Taylor .................... H02J 5/005 307/31 |
| 2015/0244341 A1 | 8/2015 | Ritter et al. |
| 2015/0303699 A1 | 10/2015 | Wagman et al. |
| 2016/0056662 A1 | 2/2016 | Yoon |
| 2016/0126775 A1 | 5/2016 | Park et al. |
| 2016/0134134 A1 | 5/2016 | Baarman et al. |
| 2017/0093218 A1 | 3/2017 | Hrinya et al. |

FOREIGN PATENT DOCUMENTS

| | | |
|---|---|---|
| CN | 101902062 | 12/2010 |
| JP | H0767263 | 3/1995 |
| KR | 20100110356 | 10/2010 |
| KR | 1020130106840 | 9/2013 |
| WO | WO 2008/044875 | 4/2008 |
| WO | WO 2013/090565 | 6/2013 |
| WO | WO 2013/142720 | 9/2013 |

OTHER PUBLICATIONS

International Search Report and Written Opinion dated May 4, 2015, PCT/US2014/053482, 18 pages.
U.S. Appl. No. 15/152,444, filed May 11, 2016, Hrinya et al.
U.S. Appl. No. 14/086,737, filed Nov. 21, 2013, Menzel et al.
U.S. Appl. No. 14/503,363, filed Sep. 30, 2014, Moyer et al.
U.S. Appl. No. 14/503,366, filed Sep. 30, 2014, Alves et al.
Zhusheng et al., "Design and Application of Wireless Charging Technology for Electric Vehicle," Electric Age, May 31, 2012, vol. 5, pp. 26-28 (10 pages with translation).
"Benefits of Optical Communications," NASA, published May 6, 2014, accessed online Feb. 24, 2017, https://www.nasa.gov/directorates/heo/scan/engineering/technology/txt_opticalcomm_benefits.html, 3 pages.
"System Description Wireless Power Transfer," Volume I: Low Power, Part 1: Interface Definition, Version 1.0.1, Wireless Power Consortium, Oct. 2010, 86 pages.
"System Description Wireless Power Transfer," Volume I: Low Power, Part 1: Interface Definition, Version 1.1.1, Wireless Power Consortium, Jul. 2012, 247 pages.
Johns et al., "Designing a Qi-compliant receiver coil for wireless power systems, Part 1," Texas Instruments Incorporated, High-Performance Analog Products, *Analog Applications Journal*, www.ti.com/aaj, 3Q 2012, 9 pages.

\* cited by examiner

POWER MANAGEMENT FOR INDUCTIVE CHARGING SYSTEMS

CROSS-REFERENCE TO RELATED APPLICATION

This application claims the benefit under 35 U.S.C. §119 (e) of U.S. Provisional Patent Application No. 61/873,256, filed on Sep. 3, 2013, entitled "Power Management for Inductive Charging Systems," which is incorporated by reference as if fully disclosed herein.

TECHNICAL FIELD

This disclosure relates to electromagnetic inductive power transfer, and in particular to adaptive power control systems for maximizing the efficiency of power transfer.

BACKGROUND

Many electronic devices include one or more rechargeable batteries that require external power to recharge from time to time. Often, these devices may be charged using the same or similar connection type, for example via universal serial bus ("USB"). However, despite having common connection types, multiple devices often require separate power supplies with different power outputs. These separate power supplies are burdensome to use, store, and transport from place to place. As a result, the benefits of device portability are substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive recharging system. The user may simply place the device on an inductive charging surface in order for the battery to be recharged. However, due to extra circuitry within the portable electronic device required to support the inductive charging system, battery life of the device may be undesirably reduced. For example, to maintain or reduce the form factor of the device, the battery may be reduced in size or capacity. In another example, the inductive charging system may present a load to the battery when the system is not in use, reducing battery life. Accordingly, although inductively charged devices may be more convenient for the user, they may need to be recharged more often.

Therefore, there may be a present need for a method of delivering useful power to a portable device that does not require a separate power supply and does not itself deplete the battery of the portable electronic device.

SUMMARY

This application provides techniques for delivering useful power to a portable electronic device that does not deplete the battery of the portable electronic device. Certain embodiments described herein may relate to or take the form of an adaptive power control system for controlling and optimizing an electromagnetic induction power transfer. In certain embodiments, the adaptive power control system may include a wireless signal receiver, an alternating current power supply operated at a selected frequency and/or duty cycle, a power-transmitting inductor such as a coil, that may be coupled to the power supply, and a current monitor coupled to the power-transmitting inductor. The current monitor may be configured to determine the current load of the power-transmitting inductor. When the current monitor detects that the current load of the inductor has changed, the operating frequency of the power supply may be changed.

For example, in certain embodiments, the operating frequency may be increased in order to reduce the power transmitted from the power-transmitting inductor. In other embodiments, the frequency may be decreased in order to increase the power transmitted from the power-transmitting inductor. In other examples, the operating frequency may be decreased in order to supply lower power or may be increased to supply greater power. In addition, the operating frequency of the power supply may be changed in response to a signal received from the wireless signal receiver. In certain embodiments, the power supply may be turned off in response to a current load below a current load minimum threshold. In another example, the power supply may be turned off and/or disconnected from an associated power source if a signal is not received from the wireless signal receiver. In other words, if the wireless signal receiver does not affirmatively transmit the signal, the power-transmitting inductor may operate as though the wireless signal receiver is not present. In this manner, the wireless signal receiver may effectively 'cloak' its presence by selectively disabling one or more communication circuits adapted to send signals to the power-transmitting inductor.

In further embodiments, modification of the operating frequency of the power supply in response to the current load may occur substantially simultaneously with changes in current load. In this way, when the current load changes, the operating frequency of the power-transmitting coil may be rapidly changed to compensate. In some embodiments, the amount of change may be fixed below a certain maximum per change or a certain maximum for a fixed time period. For example, increases or decreases in power transmitted may be limited to a certain amount per microsecond.

In other embodiments, the signal received from the wireless signal receiver may be a feedback signal sent at an interval from a portable electronic device inductively proximate the power-transmitting inductor. For example, the feedback signal may include information about the real-time current requirements of the portable electronic device. For example, if the portable electronic device is operating in a charge-only mode, the real-time power requirements may be less than if the portable electronic device is charging at the same time the device is being operated by a user.

In other embodiments, the feedback signal may include identifying information regarding the portable electronic device. Such identifying information may include the expected power requirements of the portable electronic device. For example, the portable electronic device may require a known voltage and amperage. These known values may not necessarily change with changes in the operational modes of the device, although in some embodiments, these known values may change. Accordingly, the portable electronic device may include the expected, but not necessarily real-time, power requirements of the device within the signal sent to the wireless receiver.

In further embodiments, modification of the operating frequency of the power supply in response to the feedback signal sent from the portable electronic device may override any modification of the operating frequency of the power supply in response to the current load. For example if an electrically conductive material is placed inductively proximate the power-transmitting inductor, eddy currents may be induced within the material which may measurably increase the current load on the power-transmitting inductor. In such a circumstance, the load increase, and corresponding change in frequency of the power supply, as seen by the current monitor is not a result of a power requirement increase of a portable electronic device. Thus, when a feedback signal sent from the portable electronic device does not include power information that matches the current power output of the power-transmitting inductor, the feedback signal may override the previous change in frequency.

In certain other embodiments, a change in the power requirements of the portable electronic device may increase the current load on the power-transmitting inductor before a signal may be sent from the portable electronic device to the wireless signal receiver noting the change. In this circumstance, the current monitor may note the increase in the current load on the power-transmitting inductor and correspondingly adjust the operational frequency of the power supply. Thereafter, a feedback signal may be received by the wireless signal receiver confirming that the power requirements of the portable electronic device have increased. In this and similar embodiments, power requirement changes of the portable electronic device are respected immediately, and are not dependent upon an affirmative signal from the portable electronic device itself.

In other embodiments, once a modification of the operating frequency of the power supply, in response to the current load, is overridden by a modification of the operating frequency of the power supply in response to the feedback signal, subsequent modification of the operating frequency of the power supply in response to a subsequent change in current load may be ignored for a select timeout period. In certain cases, this select timeout period may be less than the interval of the feedback signal or, in other cases, the select timeout period may be greater than the interval of the feedback signal. One may appreciate that the timeout period may vary from embodiment to embodiment.

In certain embodiments, a portable electronic device inductively proximate the power-transmitting inductor may include a surge protection circuit, such as a capacitor, operative to prevent damage to the portable electronic device as a result of an increase in power transmitted by the power-transmitting inductor. For example if the power-transmitting inductor increases the power it transmits, there may be a power surge in the power-receiving circuitry of the portable electronic device. Including a capacitor or other surge protection circuitry may prevent damage to the portable electronic device as a result of an unexpected increase in the power by the portable electronic device.

Embodiments described herein may also relate to or take the form of an adaptive power system for a portable electronic device. Certain embodiments of the described power system may include a battery, a power-receiving inductor having at least an idle state and a receiving state, a power conversion controller coupled to the power receiving inductor, a power management controller coupled to the power conversion controller and the battery, a charge monitor coupled to the battery and the power conversion controller, and a ground connection controller. In certain cases, when the power-receiving inductor is in the idle state, the ground connection controller may disconnect the charge monitor entirely from circuit ground. In this manner, all circuits connected through the ground connection controller do not complete a circuit to ground and thus do not present a load to the battery of the portable electronic device. In other cases, when the power-receiving inductor is in the receiving state, the ground connection controller may connect the charge monitor directly to circuit ground such that the charge monitor may perform its function.

In certain embodiments, the power conversion controller comprises a rectifier and voltage regulator. In this manner, the power conversion controller may receive alternating current and may output regulated direct current. In certain embodiments, the power conversion controller may also include a voltage comparator between the present voltage of the battery and the present voltage output from the voltage regulator. In this manner, the power conversion controller may determine whether the voltage of the battery is low enough to require recharging or in the alternative, whether the voltage of the battery is high enough to be considered fully charged. In certain cases, when the battery is considered fully charged, the power conversion controller may shut down.

In certain other embodiments, the power management controller may include at least a charging state and a direct operation state. For example, the charging state may include the power management controller coupling the power conversion controller to the battery for charging the battery. On the other hand, the direct operation state may include the power management controller coupling the power conversion controller to circuitry of the portable electronic device such that the portable electronic device may be operated without drawing power from the battery. In this manner, the portable electronic device may be exclusively or substantially operated by power received from the power-receiving inductor.

In further embodiments, the ground connection controller may be a switch circuit for controlling an electrical connection to ground. In certain cases, the ground controller may be a solid state or mechanical relay. In other cases, the ground controller may be a field effect transistor ("FET"). One may appreciate that a ground connection controller may take a number of forms.

Further embodiments described herein may relate to or take the form of a method of controlling an inductive charging system within a portable electronic device having a battery. Such embodiments may start by determining whether the portable electronic device is inductively proximate a power transmitter. In the event that the portable electronic device is inductively proximate a power transmitter, a direct connection to ground of the inductive charging system may be provided. In the event that the portable electronic device is not inductively proximate a power transmitter, a direct connection to ground of the inductive charging system may be removed. In related embodiments, determining that the portable electronic device is inductively proximate a power transmitter includes monitoring a voltage across a power receiving inductor within the portable electronic device.

In further related embodiments, providing a direct connection to ground includes setting a ground connection controller to an on state. Similarly, removing a direct connection to ground includes setting the ground connection controller to an off state. In some cases, setting the state of the ground connection controller is directly related to the voltage across the power receiving inductor. For example, when the voltage across the power receiving inductor is below the select magnitude, the ground connection controller is set to an off state. Similarly, when the voltage across the power receiving inductor is above the select magnitude, the ground connection controller is set to an on state.

Further embodiments described herein may relate to or take the form of a method of modifying power output of an electromagnetic induction power transfer transmission circuit. The process may begin by determining a current load on a power-transmitting inductor supplied with an alternating current at a frequency, adjusting the frequency in response to the determined current load, receiving a signal of power required, and modifying the adjusted frequency in response to the received signal.

In further related embodiments, adjusting the frequency in response to the current load may include increasing the frequency to reduce the power output from the power-transmitting inductor or, in the alternative, decreasing the frequency to increase the power output from the power-transmitting inductor.

In further embodiments, other mutable properties of the power-transmitting inductor may be augmented in response to changes in current load detected by the current monitor. For example, the voltage applied to the power-transmitting inductor may be increased in response to a detected increase in load. In a related example, the voltage applied to the power-transmitting inductor may be reduced in response to a detected decrease in the load. The rate of increase or decrease in applied voltage may be fixed or, in alternate embodiments, the rate of change of the voltage may be variable. Further, one may appreciate that any mutable property of the power-transmitting inductor may have an effect on power transmission efficiency such that changing the property as a function of detected current load may result in a more efficient energy transfer.

In still further embodiments, multiple mutable properties of the power-transmitting inductor may be augmented in response to changes in current load detected by a current monitor. For example, both voltage and frequency applied to a power-transmitting inductor may be changed in response to a single detected change in current load. In many examples, mutable properties of the power-transmitting inductor can be changed or modified in any number of ways. For example, voltage applied to the power-transmitting inductor can be changed before or after the frequency and/or duty cycle is selected or applied. In another example, duty factor control can be applied to a power-transmitting inductor to adjust the voltage applied to the power transmitting inductor.

In still further embodiments, augmentation of the mutable properties of the power-transmitting inductor may be done to maximize power received by a power-receiving inductor, and not for efficiency reasons. For example, in certain embodiments, a portable electronic device may be powered completely by power received from a power-transmitting inductor. In such a case, a battery within an inductively proximate portable electronic device may not support or otherwise power the portable electronic device at all. Instead, the purpose of augmenting frequency or voltage or other mutable properties of the power-transmitting inductor may be to respond instantaneously to changes in system load.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Figure 1:
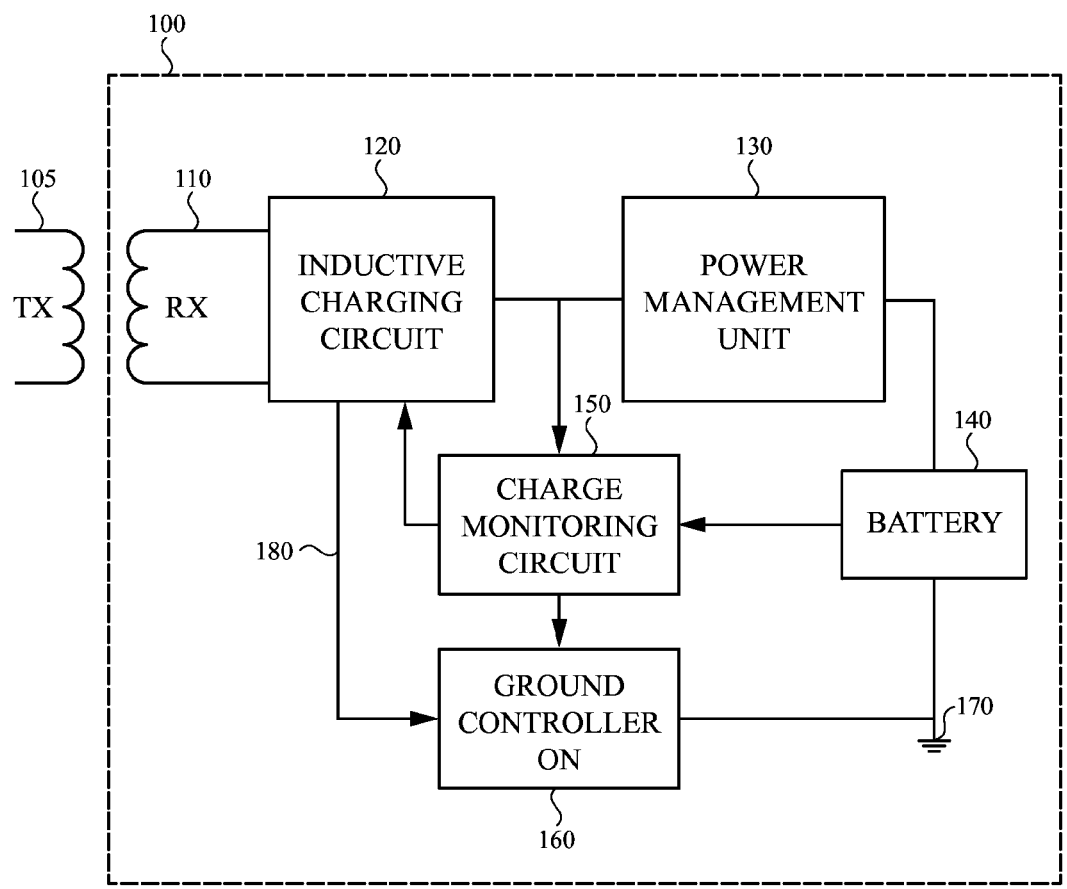
FIG. 1 is a signal flow diagram in accordance with an embodiment of the present disclosure showing a ground connection controller in an on state.

Embodiments described herein relate to power management and power transfer optimization within both the transmit and receive portions of an inductive charging system. An inductive charging system may include an inductive charging station to transmit power and a portable electronic device to receive power. Portable electronic devices may include media players, media storage devices, personal digital assistants, tablet computers, cellular telephones, laptop computers, smart phones, styluses, global positioning sensor units, remote control devices, health monitoring devices, wearable devices, sports accessory devices, electric vehicles, home appliances, medical devices and the like.

Certain embodiments may take the form of power management systems within a portable electronic device. For example, when a portable electronic device is placed inductively proximate an inductive charging station, the portable electronic device may activate inductive charging circuitry. Such circuitry may include a power-receiving inductor or, in other words, a power receiving coil.

A receive coil included within a portable electronic device may be complemented by a transmit coil included as a portion of an inductive charging station. When the portable electronic device is placed inductively proximate the charging station, a mutual inductance between the transmit coil and the receive coil may be created. In other words, current flow within the transmit coil may induce a voltage across the leads of the receive coil through electromagnetic induction.

The quality of the mutual inductance or inductive coupling may be substantially affected by many factors including the relative alignment of the transmit coil and the receive coil and the distance between the two. One may appreciate that for increased power transfer between the transmit and the receive coil, the coils should be close together and aligned along a mutual axis. One may further appreciate that electromagnetic induction requires the current supplied to the transmit coil to change as a function of time. Often, alternating current is supplied at a frequency selected based upon the geometry and number of turns of the transmit coil and receive coil. In certain embodiments, the frequency selected for the alternating current supplied to the transmit coil may be approximately 150 kHz. In other embodiments, the frequency selected may be greater than or less than 150 kHz.

Further embodiments of power management systems within portable electronic devices may include a power conversion controller, designed to account for many of the issues described above. For example, an imprecise alignment of the receive and transmit coils may result in only a small amount of power transferred between the two. Accordingly, a power conversion controller may include a voltage monitor such that if the voltage output from the receive coil is too low, other circuitry within the portable electronic device, such as battery charging circuitry, may be disabled. Similarly, a power conversion controller may activate battery charging circuitry if the voltage output from the receive coil is sufficiently high.

The power conversion controller may also include a bridge rectifier, or other alternating to direct current converter. The power conversion controller may also include a voltage regulator. In this manner high frequency alternating current output from the receive coil may be converted to direct current at a voltage useful to charge a battery within the portable electronic device.

In certain embodiments, the voltage monitor may also include a voltage comparator between the voltage of the battery and the voltage output from the voltage regulator. One may appreciate that in this configuration, when the battery voltage drops below the regulator's output voltage, the battery may need to be charged. Alternately, if the battery voltage is higher than the regulator's output voltage, the battery does not need to be charged.

As noted above, the power conversion controller enables the portable electronic device to intelligently receive and utilize power when the portable electronic device is inductively proximate the transmit coil. However, when the portable electronic device is removed from the electromagnetic influence of the transmit coil, the power conversion controller circuitry does not serve any function. As a result, the unused circuitry may constitute a resistive load on a battery within the portable electronic device. This resistive load may cause the battery to drain at an accelerated rate.

To account for the power drain from inductive charging circuitry in a non-charging state, certain embodiments may include a ground connection controller. A ground connection controller may prevent a particular circuit, sub-circuit, or circuit element from connecting to ground. Without a connection to ground, a circuit or sub-circuit is not electrically complete and thus does not exhibit any resistive load or power drain. Accordingly, a ground connection controller coupled to the power conversion controller, or portions of the power conversion controller, may selectively remove the connection to ground, effectively disabling the circuitry without the risk of unintended power loss.

The ground connection controller may be a switch circuit for controlling an electrical connection to ground. In certain cases, the ground controller may be a physical switch. In such an embodiment, a normally open switch may be positioned such that the switch closes only when the receive coil is in a position to inductively couple to a transmit coil.

In another embodiment, the ground connection controller may be a solid state or mechanical relay. In such an embodiment, when the ground connection controller is powered on, a connection to ground may be formed. In certain embodiments, the relay may be powered from the alternating current output from the receive coil. In this manner, the relay will connect to ground only when the receive coil is producing current or, in other words, when the receive coil is in the presence of a transmit coil.

In other cases, the ground controller may be a field effect transistor ("FET"). In certain embodiments, the FET may be an n-channel enhancement mode FET. One may appreciate a conductive channel does not exist between the source and drain of such a transistor until a sufficient positive voltage at the gate with respect to the source is applied. In other words, if there is zero voltage at the gate of the FET, the source and drain will be electrically disconnected. On the other hand, if a positive voltage is present at the gate, the source and drain will be electrically connected. In this and related embodiments, the source may be connected to ground, with the drain connected to the power conversion controller. The gate may be connected to the output of a voltage rectifier coupled to the receive coil such that the voltage necessary to electrically connect the source to drain is provided by the receive coil itself. In this manner, the FET will connect the power conversion controller to ground, enabling the controller, only when the receive coil is in the presence of a transmit coil.

One may further appreciate that the techniques described herein may be applied to any circuitry within the portable electronic device. For example, other circuit elements or sub-circuits may be grounded or disconnected from ground selectively based on the presence or absence of voltage output from the receive coil.

Further, one may appreciate that a ground connection controller need not be limited to the embodiments above.

Other embodiments described herein may take the form of power management systems within an inductive charging station. For example, when a portable electronic device is placed inductively proximate an inductive charging station, the inductive charging station may activate inductive power transfer circuitry. Such circuitry may include a power-transmitting inductor or, in other words, a power transmitting coil coupled to a power source outputting alternating current at a selected frequency.

As described above, a power transmitting coil may inductively couple with a power receiving coil. Upon coupling, the transmit coil will experience an increased load. Accordingly, when the power requirements of a portable electronic device change, the load experienced by the transmit coil may also change. To account for changes in power requirements of various portable electronic devices or different operational modes of a single portable electronic device, the inductive power transfer circuitry may include a current monitor. The current monitor may be positioned across a resistor of known resistance within a circuit providing power to the transmit coil. In this manner, the current load through the transmit coil may be knowable at any given time.

In certain embodiments, the output from the current monitor may be used to control the selected frequency of the output of the power source. For example, in certain embodiments more power may be transferred at lower frequencies than at higher frequencies. Accordingly, if the current monitor determines that the loading of the transmit coil has increased, the frequency of the output of the power source may be lowered in order to transmit more power. In the alternative, if the current monitor determines that the loading of the transmit coil has decreased, the frequency of the output of the power source may be raised in order to transmit less power. In this manner, the inductive charging station may enjoy increased power efficiency by not transmitting more power than is required of a device coupled with the transmit coil. In still further embodiments, other mutable properties of the output of the power source may be changed as a result of detected changes in loading of the transmit coil. For example, the voltage applied to the transmit coil may be increased or decreased in response to increases or decreases in load applied to the transmit coil.

In certain embodiments, the power output from the inductive charging station may be at least partially controlled or influenced by periodic reports from the portable electronic device itself. For example, a portable electronic device may include a wireless transmitter configured to transmit information to an inductive charging station. Such information may include identifying information, authentication information, or power state information. Power state information may include current or future power requirements, time estimations until a battery is fully charged, the current charge of the battery, or other power related information. The portable electronic device may send periodic updates, once or more per second. The wireless transmitter may be of any suitable technology such as, for example, Wi-Fi, RF, Bluetooth, near field communication ("NFC"), or infrared. In certain embodiments, the wireless transmitter may be an existing component of the portable electronic device, such as a camera flash or a display.

An inductive charging station may include a receiver to receive signals sent from an inductively coupled portable electronic device. The station may interpret these signals in order to augment, adjust or otherwise change the frequency of the output of the power source. For example, if the portable electronic device sends a signal that it requires 5 volts at 1 amp, the frequency of the output of the power source may be a different value than if the portable electronic device sends a signal that it requires 3 volts at 1 amp. In other embodiments, the inductive charging station may interpret the signals received by the receiver to augment, adjust, or otherwise change other mutable properties of the output of the power source. For example, if the portable device sends a signal that it requires 5 volts at 1 amp, the voltage of the output of the power source may be increased to a value different than that if the portable electronic device sends a signal that it requires 3 volts at 1 amp.

In further embodiments, the inductive charging station may use a combination of information received from the portable electronic device and information measured from the current monitor to dynamically, intelligently, and rapidly adjust the output of the power source. For example, the current monitor may note an increased load on the transmit coil hundreds of milliseconds before the next update signal is received from the portable electronic device. In such a case, the current monitor may increase the power output immediately and upon confirmation that the power requirements of the portable electronic device have increased at the next signal, retain the newly-determined higher power transmission frequency. In the alternative, if the current monitor notes an increased load that is not confirmed upon receipt of the next signal from the portable electronic device, the power transmission frequency may be re-set to a previous value.

In certain embodiments, the portable electronic may include a surge protection circuit, such as a capacitor, operative to prevent damage to the portable electronic device as a result of an increase in power transmitted by the transmit coil. For example, if the transmit coil increases the power it transmits, there may be a power surge in the power-receiving circuitry of the portable electronic device. Including a capacitor or other surge protection circuitry may prevent damage to the portable electronic device as a result of an unexpected increase in the power by the portable electronic device.

FIG. 1 is a signal flow diagram in accordance with an embodiment of the present disclosure showing a ground connection controller within a portable electronic device 100 in an on state. Shown is a transmit coil 105 and a receive coil 110. The receive coil 110 is coupled to inductive charging circuitry 120. The inductive charging circuitry 120 may include circuitry to convert alternating current output from the receive coil 110 to direct current useful to charge a battery 140. The inductive charging circuit may be electrically connected to a power management unit 130. The power management unit 130 may include processing circuitry to intelligently determine how to distribute power output from the inductive charging circuit 120 to the battery 140. For example, in certain embodiments, the power management unit 130 may determine that the battery 140 is not charged to full capacity. The power management unit 130 may direct power from the inductive charging circuit 120 to the battery 140 so that the battery 140 may be charged. In another embodiment, the power management unit 130 may determine that the battery 140 is already charged. In such a circumstance, the power management unit 130 may direct power from the inductive charging circuit 120 to other portions of the portable electronic device 100 so that the battery 140 is not depleted.

FIG. 1 also shows a charge monitoring circuit 150. The charge monitoring circuit may accept input from both the inductive charging circuit 120 and the battery 140. In certain embodiments, the charge monitoring circuit 150 includes a comparator to determine whether the voltage of the battery 140 or the voltage output from the inductive charging circuit 120 is higher. In certain cases, if the voltage of the battery 140 is higher than the voltage of the inductive charging circuit 120, then charge monitoring circuit 150 may direct the inductive charging circuit 120 to enter an idle state. In other embodiments where the voltage of the battery 140 is less than the voltage output from the inductive charging circuit 120 output, the charge monitoring circuit 150 may place the inductive charging circuit 120 into a power-converting state, described in further detail below.

The charge monitoring circuit 150 may be coupled to a ground controller 160. The ground controller 160 may be coupled in an on mode to the circuit ground 170. The ground controller 160 may couple the charge monitoring circuit 150 to the circuit ground 170 only when the ground controller 160 is in an on state. The ground controller 160 may receive a signal 180 (e.g., voltage) to enter the on state from the inductive charging circuit 120.

Figure 2:
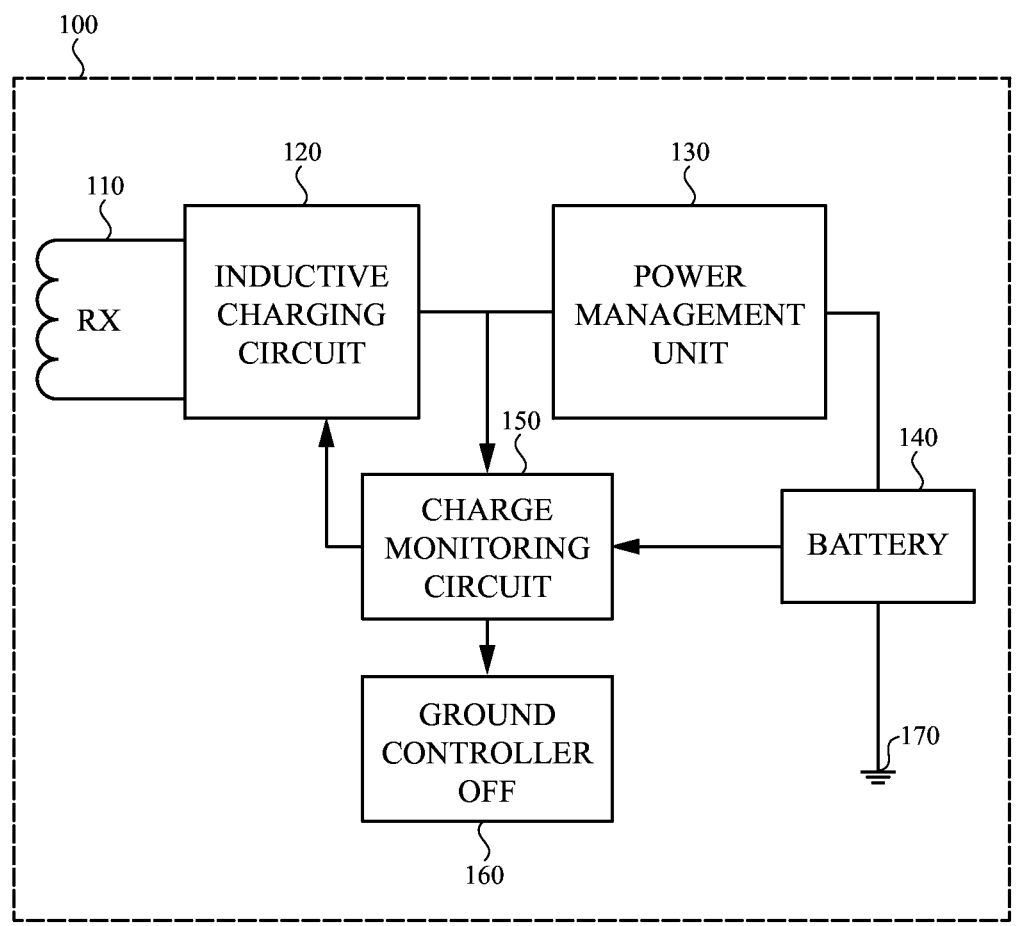
FIG. 2 is a signal flow diagram in accordance with an embodiment of the present disclosure showing a ground connection controller in an off state.

FIG. 2 is a signal flow diagram in accordance with an embodiment of the present disclosure showing a ground connection controller in an off state. FIG. 2 illustrates a receive coil 110 outside of the presence of a transmit coil. Because the receive coil 110 is outside the presence of any inductive source, there is no voltage induced at 110, and thus the inductive charging circuit 120 does not receive any power as input. As with FIG. 1, shown are the power management system 130, the battery 140, the charge monitoring circuit 150 and the ground controller 160. However, because there is no voltage present across the receive coil 110, there is no activation signal 180 (not shown) sent to the ground controller 160. Accordingly, the ground controller 160 is not connected to circuit ground 170. Because the ground controller 160 is not connected to ground 170, the charge monitoring circuit 150 is also disconnected from ground 170. As a result, there is no complete circuit, from the battery 140 to ground through the power management unit 130, the charge monitoring circuit 150, or the inductive charging circuit 120.

Figure 3:
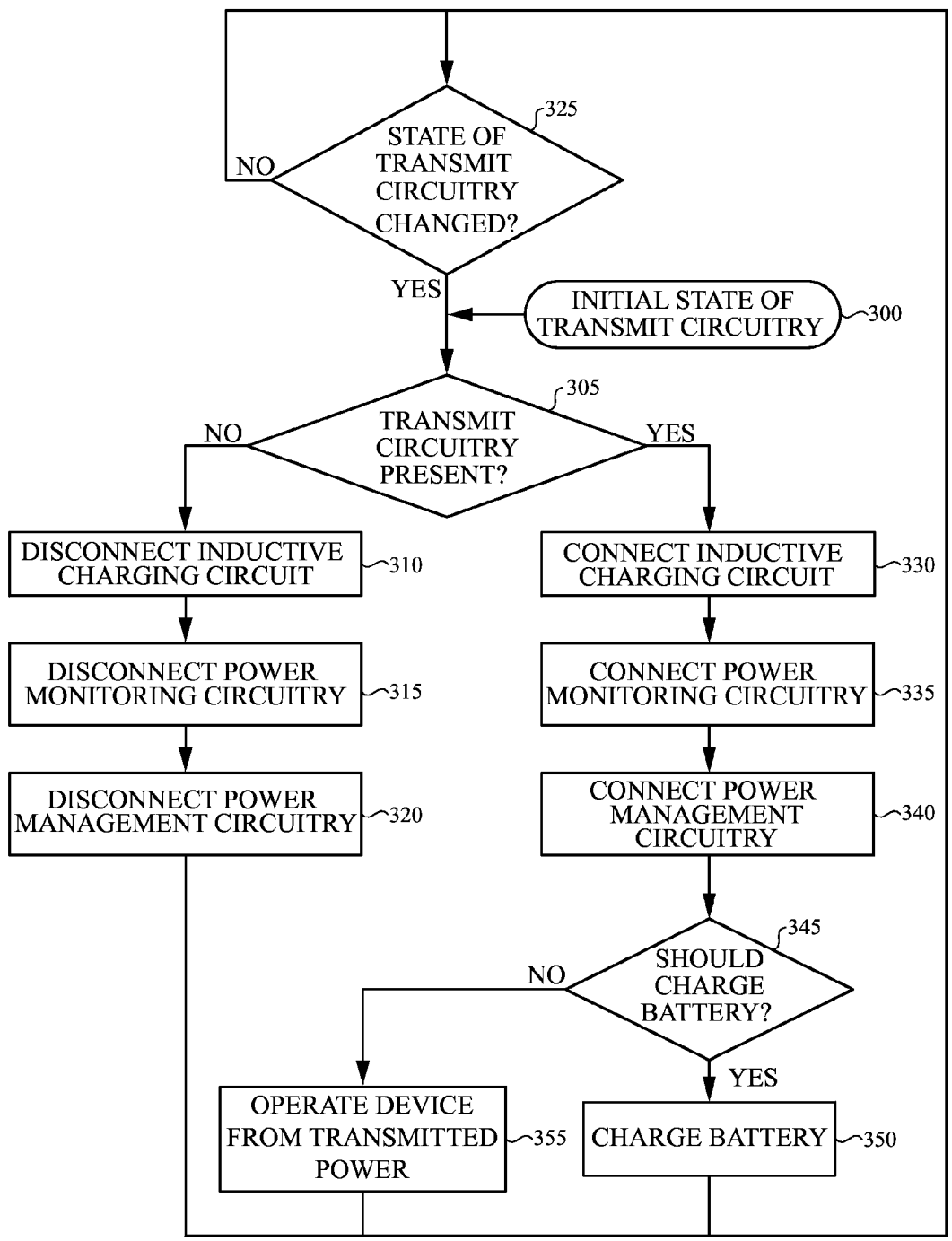
FIG. 3 is a process flow diagram showing method of controlling an inductive charging system within a portable electronic device having a battery.

FIG. 3 is a process flow diagram showing method of controlling an inductive charging system within a portable electronic device having a battery. The process may begin at 300, with the initial state of the transmit circuitry. Next at 305, the system will determine whether or not transmit circuitry is present.

If transmit circuitry is not present, the process may continue at 310, in which inductive charging circuitry is disconnected. At 315, power monitoring circuitry may be disconnected. At 320, power management circuitry may be disconnected. Thereafter, the process may cycle to 325, a loop that determines whether the state of the transmit circuitry has changed.

In the alternative, if transmit circuitry is present at 305, the process may continue at 330 in which inductive charging circuitry is connected. At 335, power monitoring circuitry may be connected. At 340, power management circuitry may be connected. Thereafter, the process may continue to 345 which may determine whether the battery should be charged. If the battery should be charged, the process may continue to 350. If the battery should not be charged (i.e., the battery is already fully charged), the process may continue to 355. Thereafter, the process may cycle to 325, a loop that determines whether the state of the transmit circuitry has changed. At 325, the method may determine whether the state, or presence, of transmit circuitry has changed. In one example, a state change may be that the transmit circuitry was previously present but is no longer present (e.g., a device was inductively proximate a transmit coil but then removed). In another example, a state change may be that no transmit circuitry was detected previously, but that transmit is currently present (e.g., a device was placed inductively proximate a transmit coil). If the state does not change, 325 may wait until a change occurs.

One may appreciate that although many embodiments are disclosed above, that the operations presented in FIG. 3 are meant as exemplary and accordingly are not exhaustive. One may further appreciate that alternate operation order, or a process with fewer or additional steps, may be appropriate to practice the disclosed method.

Figure 4:
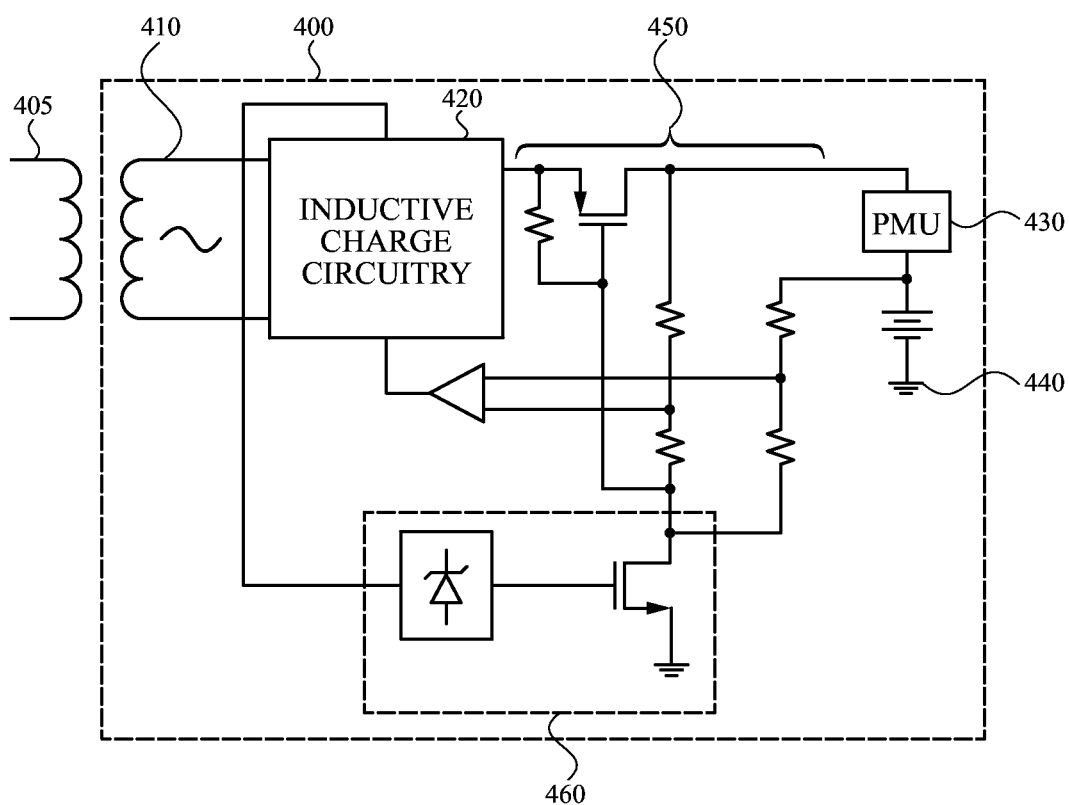
FIG. 4 is a schematic diagram of a sample embodiment of the present disclosure, showing a ground connection controller as a portion of the inductive charging circuitry of a portable electronic device.

FIG. 4 is a partial schematic diagram of a sample embodiment of the present disclosure, showing a ground connection controller as a portion of the inductive charging circuitry of a portable electronic device 400. External the portable electronic device 400 is transmit coil 405. The transmit coil 405 is positioned inductively proximate the receive coil 410. As with the embodiment shown in FIG. 1, the receive coil 410 is coupled to inductive charge circuitry 420, in this case illustrated as an integrated circuit. One may appreciate that although the inductive charge circuitry 420 is presented as a single element, the function of the inductive charge circuit 420 may be performed by either discrete components, analog components, and/or one or more individual integrated circuits. The inductive charge circuitry 420 is coupled to a power management unit 430, which itself is coupled to a battery 440. A comparator circuit 450 is coupled between the battery 440 and the inductive charging circuitry 420. Lastly, the ground connection controller 460 is shown connecting the comparator circuit 450 to ground.

The comparator circuit 450 may include an operational amplifier with inputs connected to at least two separate voltages. In certain embodiments, the voltage sources used as input to the comparator may be the voltage out of at least two voltage dividers. In the simplest case, voltage out of a voltage divider is the midpoint between two resistors, one connected to ground and another connected to a voltage source. The comparator circuit as illustrated includes two voltage dividers including four resistors (two resistors for each voltage divider). One may appreciate that the values of the resistors may vary from embodiment to embodiment. For example, in one embodiment, each resistor may have the same resistance value. In another embodiment, the resistors of each voltage divider may have the same resistance value, but each voltage divider may have resistors having different values. In further embodiments, one or more resistors within each voltage divider may be a mechanically or electrically variable resistor, capable of being tuned.

As illustrated, one voltage divider of the comparator circuit 450 may extend from the output of the inductive charging circuitry 420 to the ground connection controller 460. The midpoint of this voltage divider may be connected to an input of the operational amplifier. A second voltage divider of the comparator circuit 450 may extend from the positive terminal of the battery 440 to the ground connection controller 460. The midpoint of this voltage divider may also be connected to a secondary input of the operational amplifier. The output of the operational amplifier of the comparator circuit 450 may be coupled to the inductive charging circuitry 420.

Other embodiments described herein may take the form of a method of modifying one or more mutable properties of the power output of an electromagnetic induction power transfer transmission circuit. In one example, the selected mutable property of the power output may be the frequency of the output. The process may begin by determining a current load on a power-transmitting inductor supplied with an alternating current at a frequency, adjusting the frequency in response to the determined current load, receiving a signal of power required, and modifying the adjusted frequency in response to the received signal.

Figure 5:
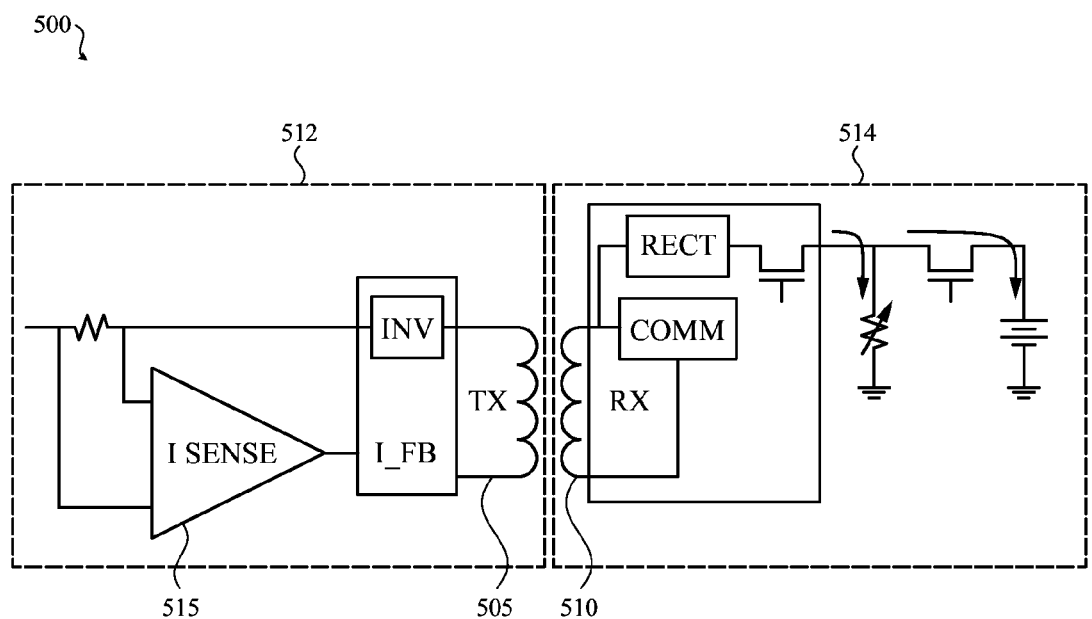
FIG. 5 is a schematic diagram of a sample embodiment of the present disclosure, showing a current load monitor connected to the transmit coil of an induction charging system.

FIG. 5 is a schematic diagram of a sample embodiment of the present disclosure, showing a current load monitor 515 connected to the transmit coil 505 of an induction charging system 500. One portion of the inductive charging system 500 includes the inductive power transmitter 512, which is positioned inductively proximate the inductive power receiver 514 such that a transmit coil 505 is positioned inductively proximate a receive coil 510. The power transmitting coil 505 may inductively couple with a power receiving coil 510. Upon coupling, the transmit coil 505 will experience an increased load, or in other words will draw additional load itself. Accordingly, when the power requirements of the inductive power receiver 514 change, the load experienced by the transmit coil 505 may also change. The current monitor 515 may be positioned across a resistor of known resistance within a circuit providing power to the transmit coil 505. In this manner, the current load through the transmit coil may be knowable at any given time.

Knowing the current load may be useful to determine whether efficiency of the inductive power transmitter 512 may be increased. For example, in one embodiment, an inductive power transmitter 512 requiring additional current (i.e., additional load) may simply draw additional current itself transmitting additional power at the same operational frequency as before the load increased. In another example, the inductive power transmitter 512 may change its operational frequency. By changing the operational frequency up or down, the transmit coil 505 may more efficiently transmit power.

Accordingly, output from the current load monitor 515 may be used in order to augment, in real-time, the operational frequency of the power transmitter 512. In one example, if load increases along the transmit coil 505, the current load monitor 515 may signal the inductive power transmitter 512 to reduce the operational frequency of the transmit coil 505 in order to more efficiently transmit the additional power required by the inductive power receiver 514. In another example in which load decreases along the transmit coil 505, the current load monitor 515 may signal the inductive power transmitter 512 to increase the operational frequency of the transmit coil 505 in order to more efficiently transmit the lower power required by the inductive power receiver 514. As noted with respect to other embodiments described herein, other mutable properties of the power transmitter 512 may be changed in response to variations in loading of the transmit coil 505.

Figure 6:
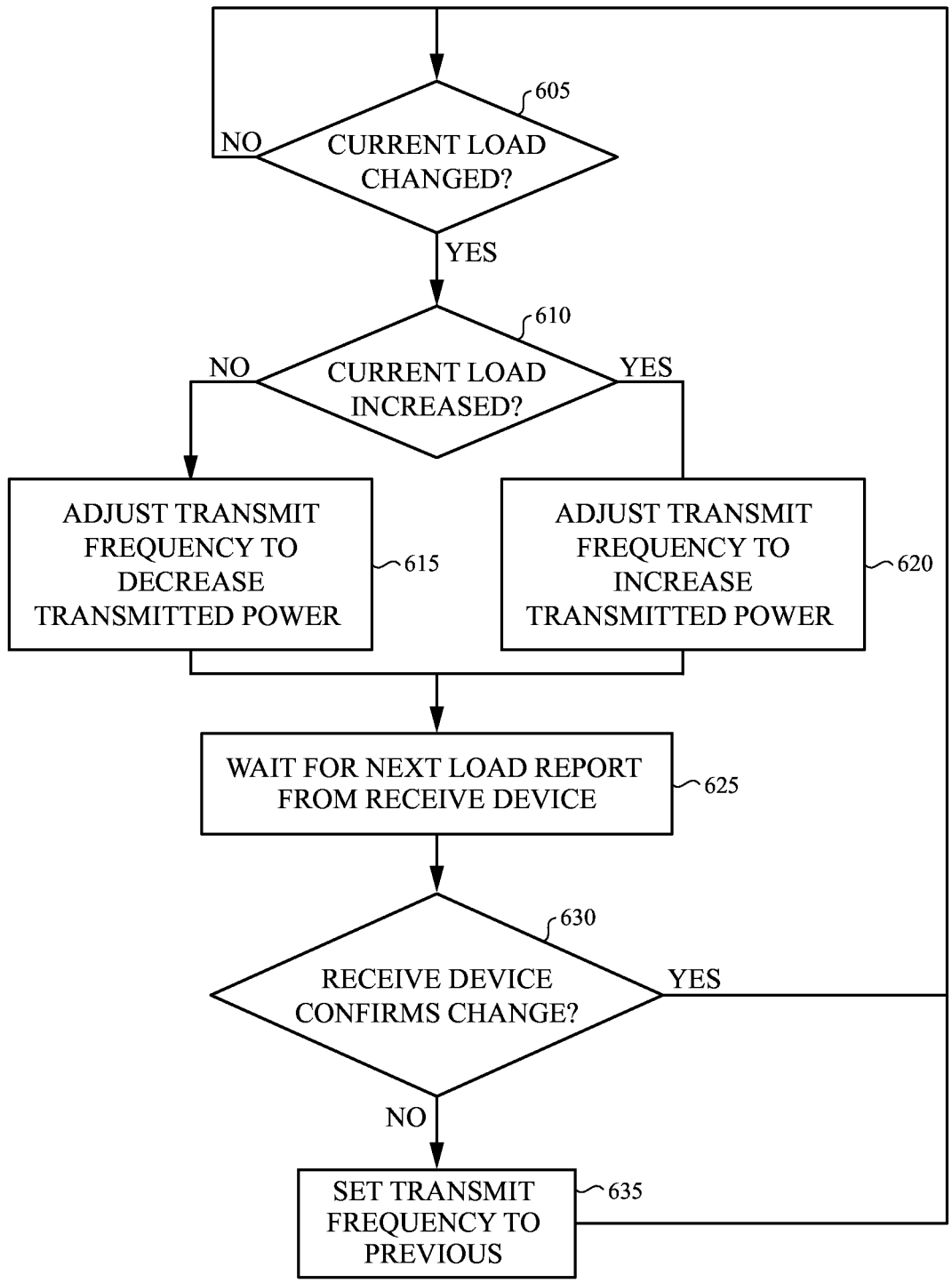
FIG. 6 is a process flow diagram showing method of controlling the transmit power of an inductive charging system.

FIG. 6 is a process flow diagram showing method of controlling the transmit power of an inductive charging system. The process may begin in which the system begins monitoring the current load of the transmit coil. Next, the system may determine at 605 whether the current load has changed. If the current load has changed, the system may determine whether the system load has increased or decreased at operation 610. If the system load has increased, then the process may continue to 620 in which the system may adjust the transmit frequency to increase the transmitted power. In the alternative, if the change registered at 605 was that the current load decreased, the process may continue to 615 in which the system may adjust the transmit frequency to decrease transmitted power. In the case of either step 615 or 620, the system may continue to step 625 in which the system may wait for the next load report sent from a power-receiving device. If the received report confirms the change at 630 previously made at 620 or 615, the process may cycle back to 605. In the alternative, if the received report does not confirm the change at 630 previously made at 620 or 615, the process may continue to 635 where the transmit frequency is re-set. Thereafter, the process may cycle back to 605.

One may appreciate that, although many embodiments are disclosed above, the operations presented in FIG. 6 are meant as exemplary and accordingly are not exhaustive. One may further appreciate that alternate step order, or a process with fewer or additional steps may be appropriate to practice the disclosed method.

This disclosure relates to power management and power transfer optimization within the transmit and receive portions of an inductive charging system. An inductive charging system may include an inductive charging station to transmit power and a portable electronic device to receive power. Embodiments may take the form of power management systems within an inductive charging station including load-based transmit frequency or voltage adjustments and power management systems within portable electronic devices which conserve power by disconnecting circuits from ground when those circuits are in an idle state.

One may appreciate that although the disclosure above is described at least in part with respect to electronic schematic diagrams, the numerous features, aspects and functionality described in one or more of the individual embodiments are not limited to the particular schematic with which they are described or illustrated. Accordingly, elements illustrated in electronic schematic diagrams are not meant to be exhaustive of the elements which may be desired, required, or otherwise included in alternate, related, or similar embodiments contemplated herein.

Where components or modules of the invention are implemented in whole or in part using software, in one embodiment, these software elements can be implemented to operate with a computing or processing module capable of carrying out the functionality described with respect thereto.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An adaptive power control system for an electromagnetic induction power transfer apparatus comprising:
   a wireless signal receiver;
   an alternating current power supply having an operating frequency;
   a power-transmitting inductor coupled to the power supply; and
   a current monitor coupled to the power-transmitting inductor and configured to determine a load of the power-transmitting inductor; wherein
   a first modification of the operating frequency of the power supply is provided in response to the load; and
   a second modification to the operating frequency of the power supply, overriding the first modification for a selected timeout period, is provided in response to a feedback signal received by the wireless signal receiver, the feedback signal sent at an interval from a portable electronic device proximate to the power-transmitting inductor.

2. The adaptive power control system of claim 1, wherein the power supply is turned off in response to a load below a load minimum threshold.

3. The adaptive power control system of claim 1, wherein modification of the operating frequency of the power supply in response to the load is substantially simultaneous with changes in the load.

4. The adaptive power control system of claim 1, wherein the select timeout period is less than the interval of the feedback signal.

5. The adaptive power control system of claim 1, wherein the select timeout period is greater than the interval of the feedback signal.

6. The adaptive power control system of claim 1, wherein the portable electronic device includes a surge protection circuit operative to prevent damage to the portable electronic device as a result of an increase in power transmitted by the power-transmitting inductor.

7. The adaptive power control system of claim 6, wherein the surge protection circuit comprises a capacitor.

8. The adaptive power control system of claim 1, wherein the first modification is limited to a selected maximum.

9. A transmitter of a wireless power transfer system, the transmitter comprising:
   a transmit coil coupled to a power source;
   a load monitor coupled to the transmit coil and configured to measure current through the transmit coil; and
   a power transfer control circuit coupled to the load monitor and configured to:
   set an operational frequency of the power source;

perform an initial modification of the operational frequency in response to a signal from the load monitor corresponding to a change in current through the transmit coil; and perform a subsequent modification of the operating frequency, overriding the initial modification for a timeout period, in response to a feedback signal received from a portable electronic device.

10. The transmitter of claim 9, wherein:

the signal is a first signal; and the power transfer control circuit is configured to disable the power source in response to a second signal from the load monitor corresponding to a determination that current through the transmit coil is below a threshold.

11. The transmitter of claim 9, wherein the power transfer control circuit is configured to disable the power source after the timeout period if the feedback signal is not received.

12. The transmitter of claim 9, wherein the power transfer control circuit is configured to retain the initial modification upon determining that the feedback signal confirms the initial modification.

13. The transmitter of claim 9, wherein the selected timeout period is longer than an interval at which the feedback signal is sent.

14. A method of controlling power transfer from a transmitter of an inductive charging station, the method comprising:

setting an initial operational frequency of an alternating current power source coupled to a transmit coil, the initial operating frequency corresponding to a first power requirement of a portable electronic device;

monitoring current through the transmit coil;

providing a first modification to the initial operational frequency upon determining that current through the transmit coil has changed;

initiating a selected timeout period after providing the first modification to the initial operating frequency;

receiving a signal from a portable electronic device before the selected timeout period expires, the signal corresponding to a second power requirement of the portable electronic device;

overriding the first modification to the initial operational frequency upon determining that the first modification does not correspond to the second power requirement; and providing a second modification to the initial operational frequency, the second modification of the initial operating frequency corresponding to the second power requirement.

15. The method of claim 14, further comprising disabling the alternating current power source in the absence of the signal.

16. The method of claim 14, further comprising restoring the initial operating frequency of the alternating current power source if the signal is not received before the selected timeout period expires.

17. The method of claim 14, wherein the first modification comprises increasing the operational frequency.

18. The method of claim 14, wherein the second modification comprises decreasing the operational frequency.

* * * * *